United States Patent [19]
Lacroix et al.

[11] Patent Number: 5,630,570
[45] Date of Patent: May 20, 1997

[54] QUICK COUPLING CONNECTOR

[75] Inventors: Jean-Jacques Lacroix, Poisy; Christophe Laporte, Doussard, both of France

[73] Assignee: Staubli Faverges, Faverges, France

[21] Appl. No.: 582,733

[22] Filed: Jan. 4, 1996

[30] Foreign Application Priority Data

Jan. 16, 1995 [FR] France .................... 95 00612

[51] Int. Cl.⁶ .................................................. F16L 29/00
[52] U.S. Cl. ................................. 251/149.9; 285/924
[58] Field of Search ........................... 251/149.6, 149.1, 251/149.9; 285/924, 316, 319

[56] References Cited

U.S. PATENT DOCUMENTS

| | | |
|---|---|---|
| 3,873,062 | 3/1975 | Johnson et al. |
| 4,483,510 | 11/1984 | Palau et al. ............... 285/924 X |
| 5,069,489 | 12/1991 | Bartholomew ............ 285/924 X |
| 5,290,009 | 3/1994 | Heilmann .................. 251/149.6 |

FOREIGN PATENT DOCUMENTS

2741512A1 4/1979 Germany.

*Primary Examiner*—Kevin Lee
*Attorney, Agent, or Firm*—Dowell & Dowell

[57] ABSTRACT

A quick coupling connector for removably connecting pipes, including a male member which is selectively connected within a female member to open a resiliently biased valve mounted within the female member. A safety ring is mounted about the female member and incorporates claws to axially retain the male member in a position intermediate a fully seated position within the female member and a fully released position after a first axial movement of a bush, which encloses both the male and female members, in a first direction opens a locking ring which also incorporates claws which are engageable with the male member and which normally secures the male member within the female member. In the intermediate position, a pipe associated with the male member is allowed to decompress after which the bush is moved in a second direction opposite the first direction, thereby releasing the claws of the safety ring and resulting in the release of the male member.

9 Claims, 6 Drawing Sheets

QUICK COUPLING CONNECTOR

BACKGROUND OF THE INVENTION

1. Field of the Invention

The present invention relates to quick connections used for removably joining pipes, of the type comprising two male and female elements adapted to fit and to lock on each other, causing automatic opening of a flap valve mounted in the female element connected to the source of the pressurized fluid which traverses the device.

2. History of the Related Art

Different types of such mechanisms for automatically locking the two fitted elements have been proposed. In U.S. Pat. No. 3,873,062 to JOHNSON, a mechanism is formed by a ring which comprises an annular element whose opening is oriented axially with respect to the body of the female element and which is secured to longitudinal sectioned claws so as to come, under the effect of elastic means associated with the ring, into engagement by their free end in an annular depression provided in the endpiece of the male element, which is thus retained axially. This locking ring is axially connected to a sliding bush which envelops the ring and the body of the female element, with the result that the axial displacement of this bush by the operator provokes, against the elastic means mentioned above, the recoil of the ring and the withdrawal of its claws from the depression of the male element which may thus be withdrawn from the female element.

Such a system functions satisfactorily for relatively moderate fluid pressures. On the other hand, if the pressure of the fluid conveyed by the pipes to be connected exceeds a certain value, when axially moving the bush to disconnect the pressurized fluid enclosed in the downstream pipe connected to the male element causes the sudden expulsion of this element from the female element, due to the fluid bearing against the closed valve. The violence of such expulsion is such that it risks injuring the operator.

It is an object of the present invention to overcome this drawback.

SUMMARY OF THE INVENTION

To that end, the present invention relates to a quick safety connector for removably joining pipes, of the type in which the locking mechanism which axially immobilizes the male element once it has been fitted in the female element, also opens a resiliently urged flap valve mounted in this female element. The connector includes an annular member provided with longitudinal claws adapted to engage, under the effect of elastic means, in an annular depression of the body of the male element, and a moveable bush whose axial displacement causes extraction of the claws from the depression and release of the male element. The female element further comprises an annular safety member incorporating claws which, intervening after a first axial movement exerted on the bush, immobilizes the male element in an intermediate position for which the flap valve is closed and the pressurized fluid enclosed in the downstream pipe associated with the male element escapes to the outside, while a second axial movement exerted on the bush in the direction opposite the preceding one, controls the annular safety member and ensures total release of the male element.

Consequently, a functioning is obtained, similar to that of the quick connections incorporating a transversely mobile lock which are of the so-called "double detent" type (cf DE-A-2 741 512 to SCHILDMANN), while conserving the structural advantages specific to the quick connections of the type incorporating claws.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
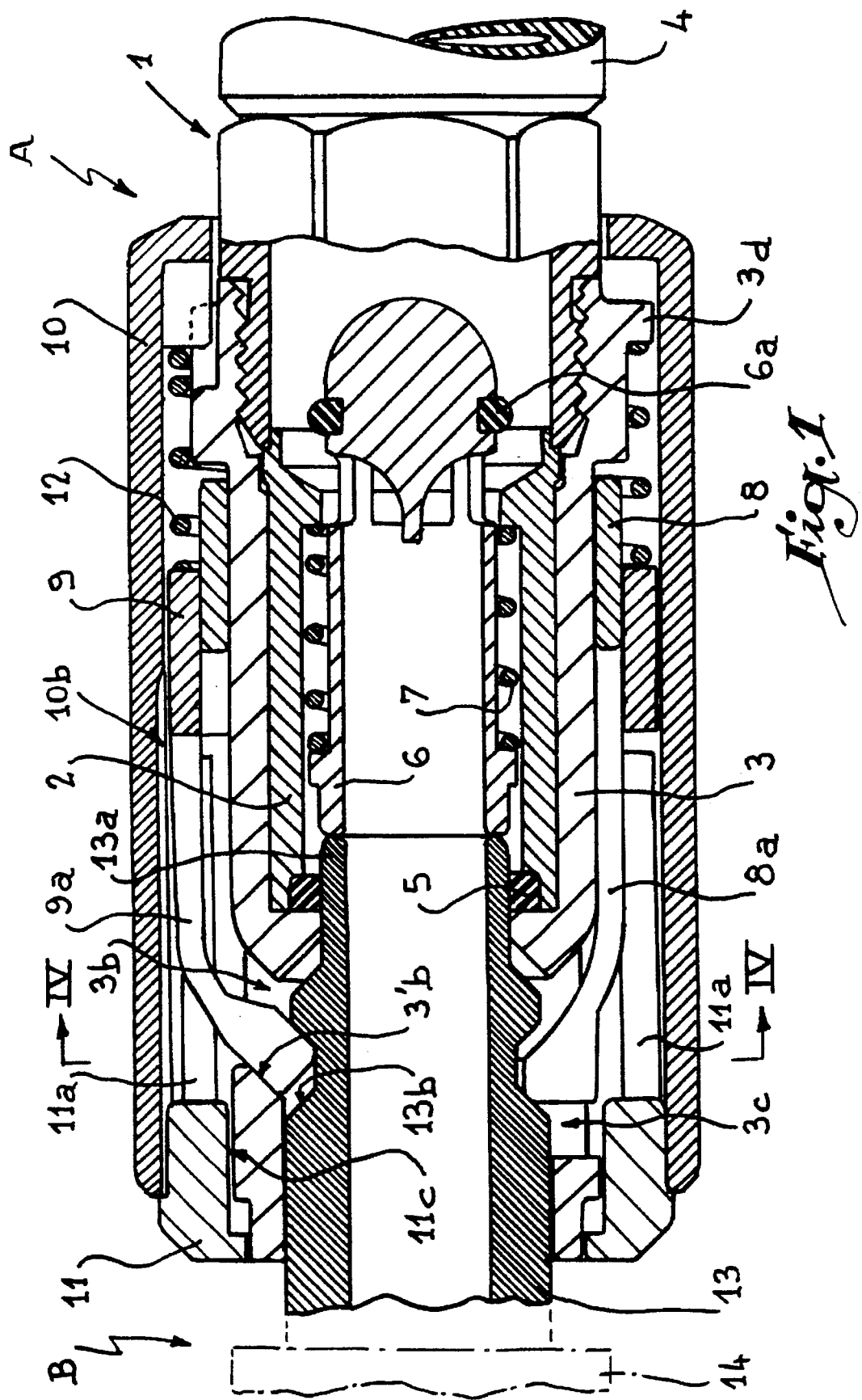
FIG. 1 is an axial section through a quick connection according to the invention, shown in the position in which its two elements are coupled.

Referring now to the drawings and firstly to FIG. 1, the female element A of the quick connection comprises a tubular body formed by the assembly of three hollow cylindrical pieces 1, 2 and 3. The rear piece 1 is profiled to fit the end of the upstream pipe 4 connected to the source of pressurized fluid, while the inner piece 2, equipped with an O-ring 5, has at its end facing rear piece 1, a tapered profile adapted to define a seat for the seal 6a carried by the head of a tubular flap valve 6 associated with a spring 7. It will be observed that the reverse may be adopted, namely the seal may be mounted on the tapered seat.

Figure 2:
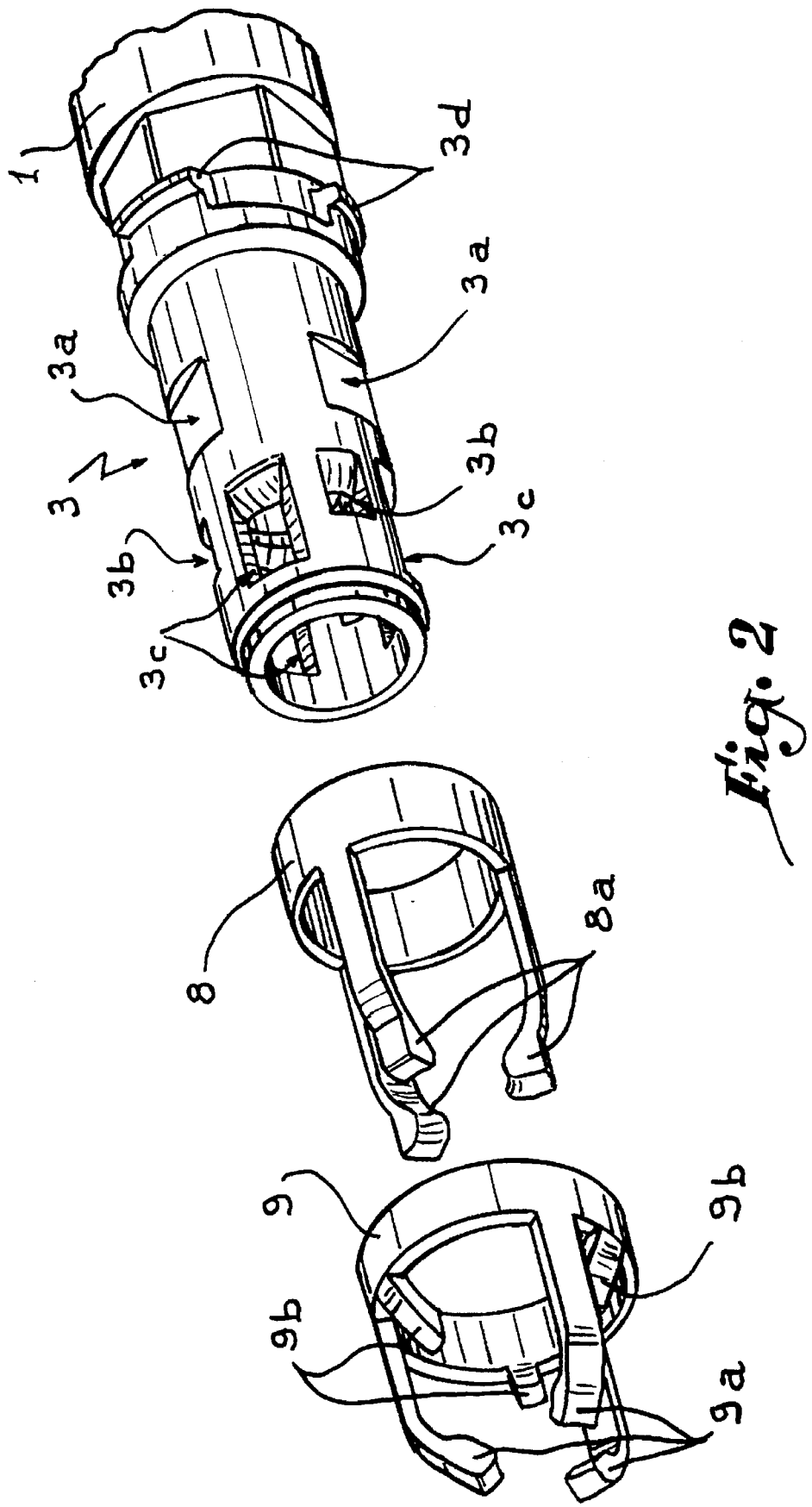
FIG. 2 is a view in perspective showing the body of the male element and the two clawed rings associated therewith, in the separated state.
Figure 4:
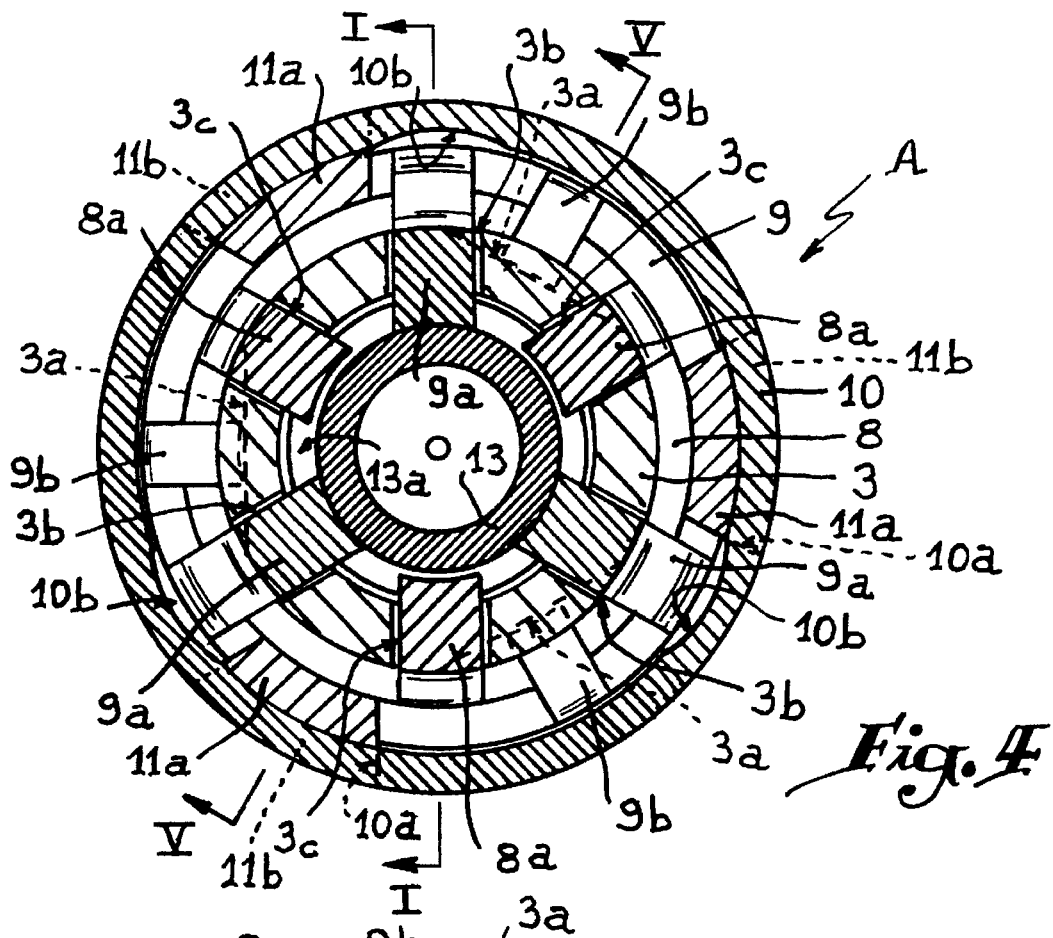
FIG. 4 is a transverse section through the connection along the plane of section indicated at IV—IV in FIG. 1; the plane of section of FIG. 1 has been recalled at I—I.
Figure 6:
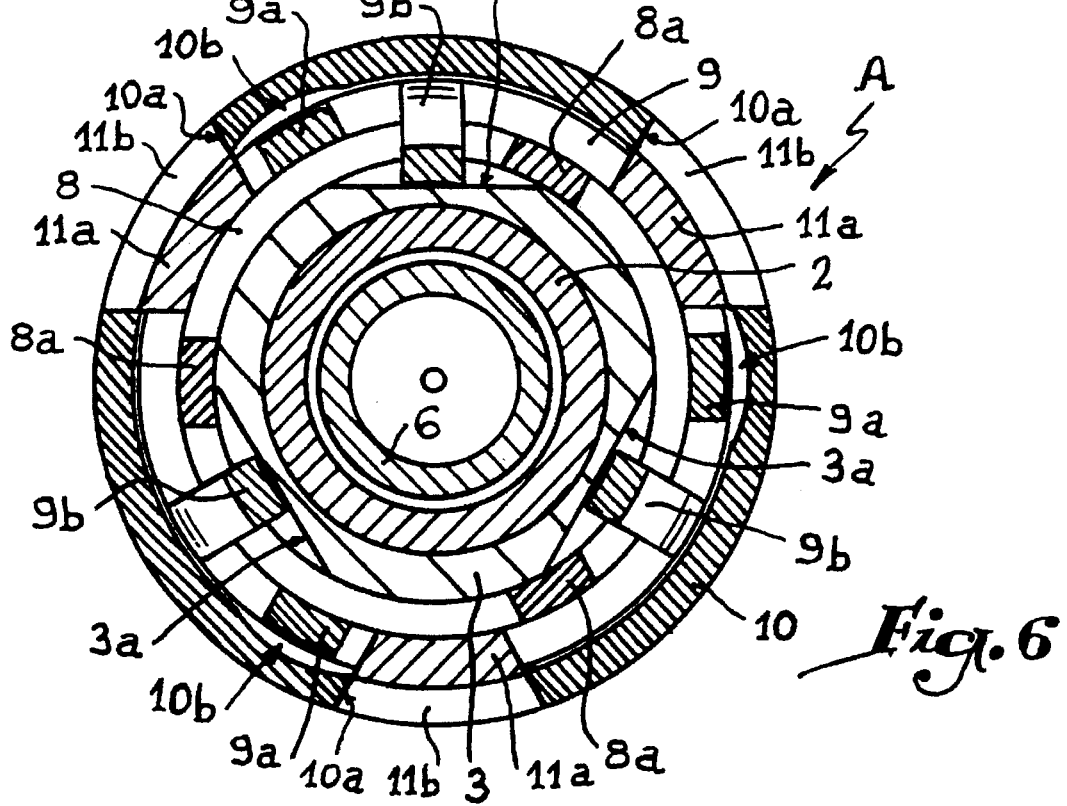
FIG. 6 is a transverse section corresponding to plane VI—VI of FIG. 5.
Figure 5:
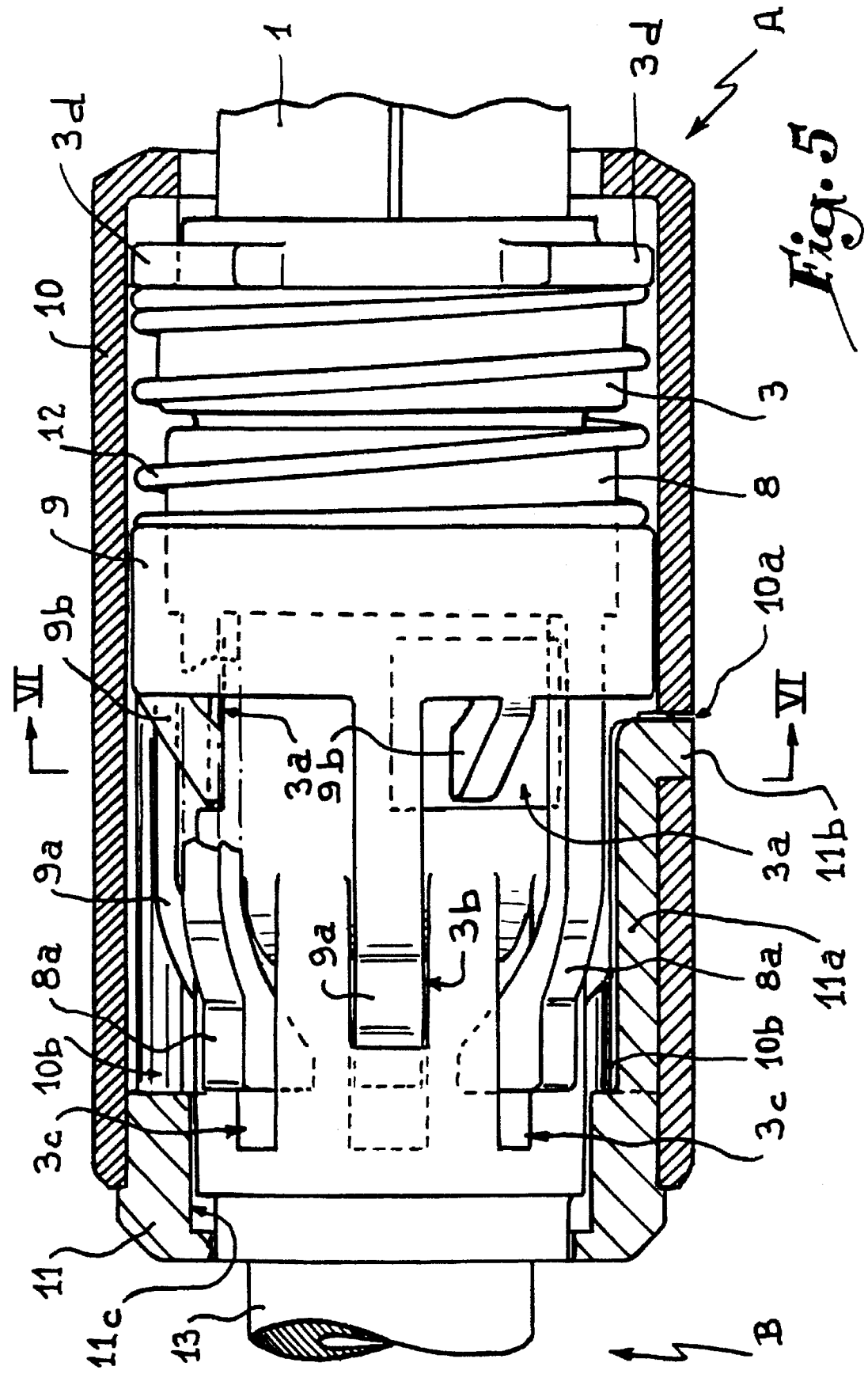
FIG. 5 is an axial section along the plane indicated at V—V in FIG. 4.

As shown in FIG. 2, the principal piece 3 of this body 1-2-3 comprises three longitudinal flat portions 3a disposed in the same transverse plane. In front of these flat portions 3a, the wall is pierced with two series of three slots respectively referenced 3b and 3c, slots 3c extending over a greater axial length than slots 3b. As may be seen in FIGS. 4 and 6, the three flat portions 3a, the three slots 3a and the three slots 3c are mutually orientated at 120° in each series.

On the principal piece 3 of the body 1-2-3 is slidably engaged a safety ring 8 provided with three forwardly facing claws 8a. These claws 8a are introduced in the long slots 3c of the piece 3 so as to project by their free end in the inner bore of the piece.

On the safety ring 8 there slides a locking ring 9 of larger diameter. This ring 9 similarly comprises three front claws 9a engaged in the short slots 3b of the piece 3. It should be observed that ring 9 includes three teeth 9a which extend forwardly between the claws 9a, the end of each tooth 9b being applied on a flat portion 3a of the body.

Figure 3:
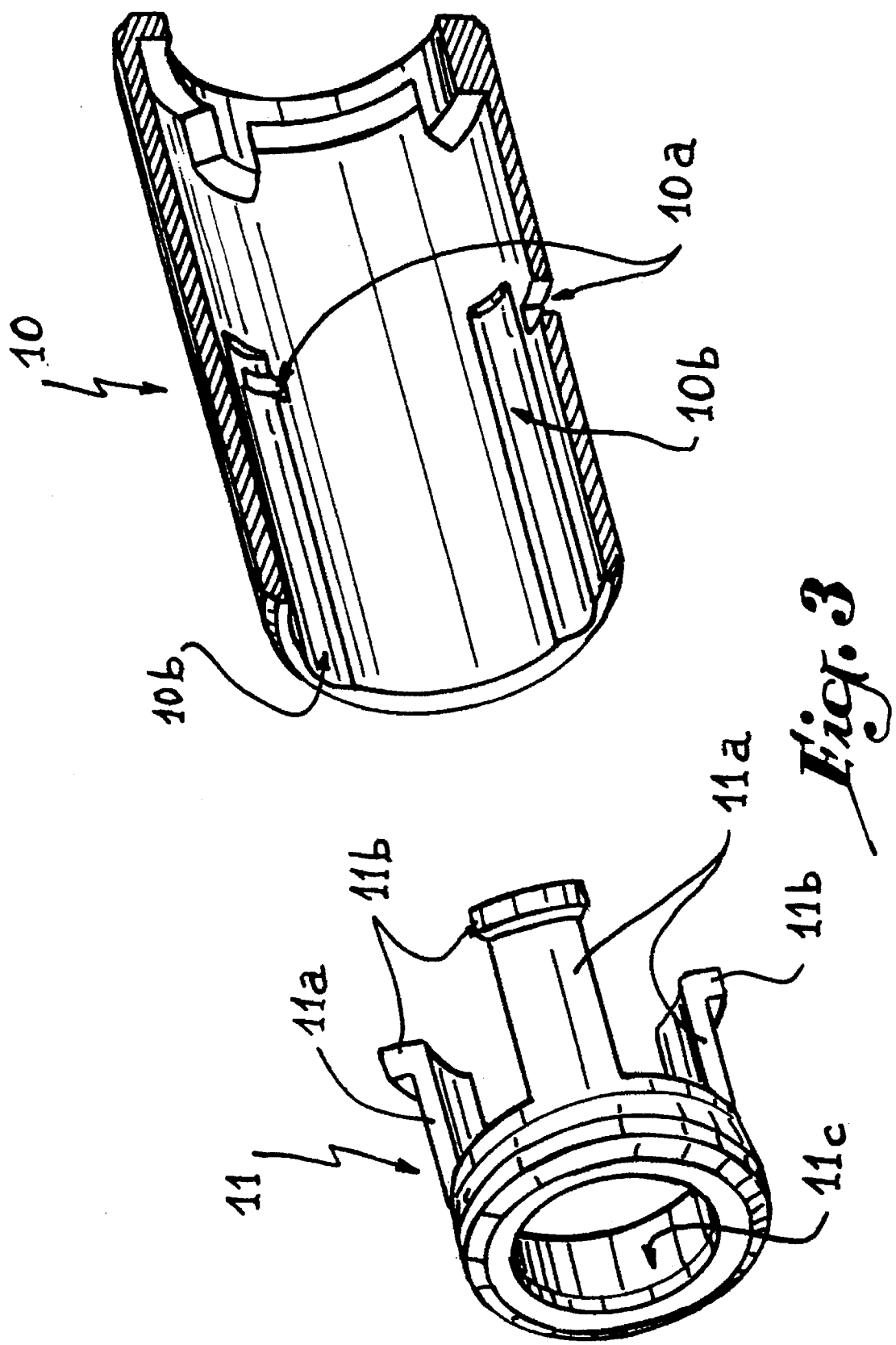
FIG. 3 illustrates the arrangement of the two pieces which, once assembled on each other, form the outer moveable bush of the connection.

The connection so comprises a moveable bush which, as illustrated in FIG. 3, is constituted by a sleeve 10 and a front bush element 11. The latter is provided with three longitudinal extensions 11a which extend rearwardly and whose free end presents an outwardly facing tab 11b so as to clip elastically in one of the three windows 10a provided in the sleeve 10, consequently ensuring reciprocal connection of the pieces 10 and 11 of the bush, both axially and in rotation.

With the locking ring 9 there is associated a spring 12 which abuts against stops 3d of piece 3 to push the ring 9 forwardly and elastically engage the claws 9a thereof inside the slots 3b. It will be observed that the claws 8a and 9a, the teeth 9b and the longitudinal extensions 11a fit between one another, ensuring guiding of rings 8 and 9 in the axial direction, in combination with slots 3b and 3c, as shown by the transverse sections of FIGS. 4 and 6.

With the female element A there is associated a male element B of conventional type. This male element B is formed by a cylindrical tubular piece 13 of which one end is fastened to the pipe 14 to be connected to the pipe 4 which is connected to the female element A, while the opposite end is in the form of an endpiece 13a adapted to be introduced in the front opening of the piece 3 of the body 1-2-3. On this piece 13 is made an annular depression 13b provided immediately to the rear of the terminal endpiece 13a.

To set forth the functioning of the connection described hereinabove, the position of connection illustrated in FIG. 1 will be the starting point. To arrive at this position, the operator has engaged the endpiece 13a in the body 1-2-3 and has brought the two elements A and B axially closer, the effects of which being, on the one hand, to push the valve 6 up to open position, on the other hand, to open the ends of the claws 9a of the locking ring 9, so that the ends are applied in the depression 13b under the effect of spring 12 associated with the ring. The two elements A and B are locked on each other, O-ring 5 ensuring tightness of the connection.

It will be observed that the claws 9a cannot open to release the piece 13 due to the oblique profile of the front edge (referenced 3'b in FIG. 1) of the short slots 3b. On the contrary, the ends of the claws 8a of the safety ring 8, although likewise engaged in the depression 13b, are not retained and may consequently move apart, with the result that they do not ensure any hold.

Figure 7:
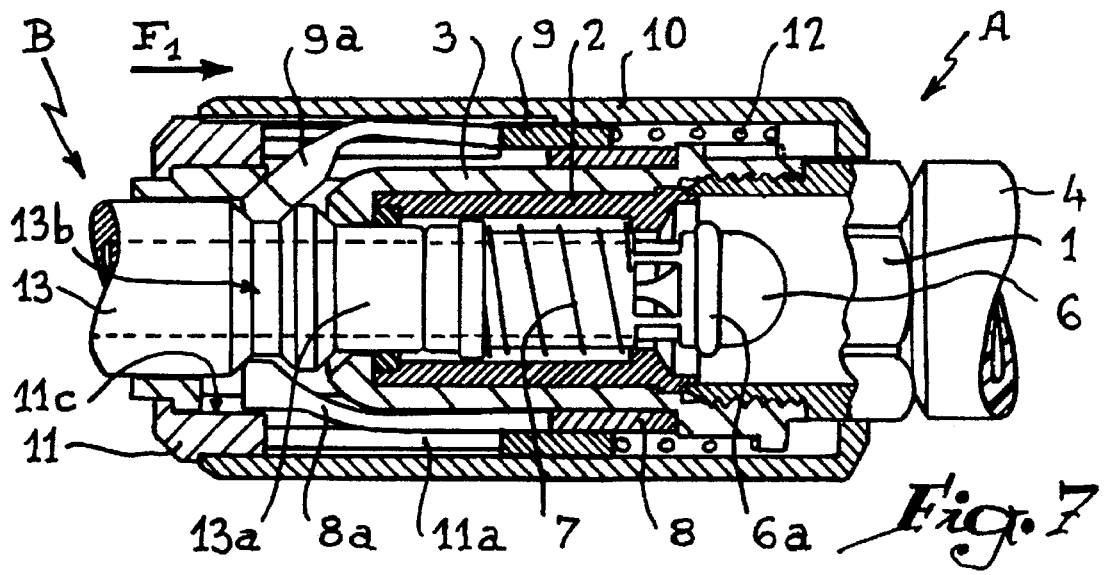
FIGS. 7, 8 and 9 are axial sections on a smaller scale similar to that of FIG. 1, showing the position of the pieces of the connection in three successive phases of the process of disconnection.

In order to dissociate the two elements A and B, the operator must in the first place displace the moveable bush 10-11 axially to the rear, i.e. in the direction of arrow F1 of FIG. 7. The extensions 11a of the bush 11 abut against the ring 9 which recoils against the spring 12, so that the ends of the claws 9a are extracted from the depression 13b and release the piece 13, which moves forwardly under the effect of the spring 7 associated with valve 6 which tends thus to push the endpiece 13a. Furthermore, the ends of the claws 8a of the safety ring 8 are covered by the axial bore 11c of the bush 11 and are consequently maintained applied in the depression 13b.

Figure 8:
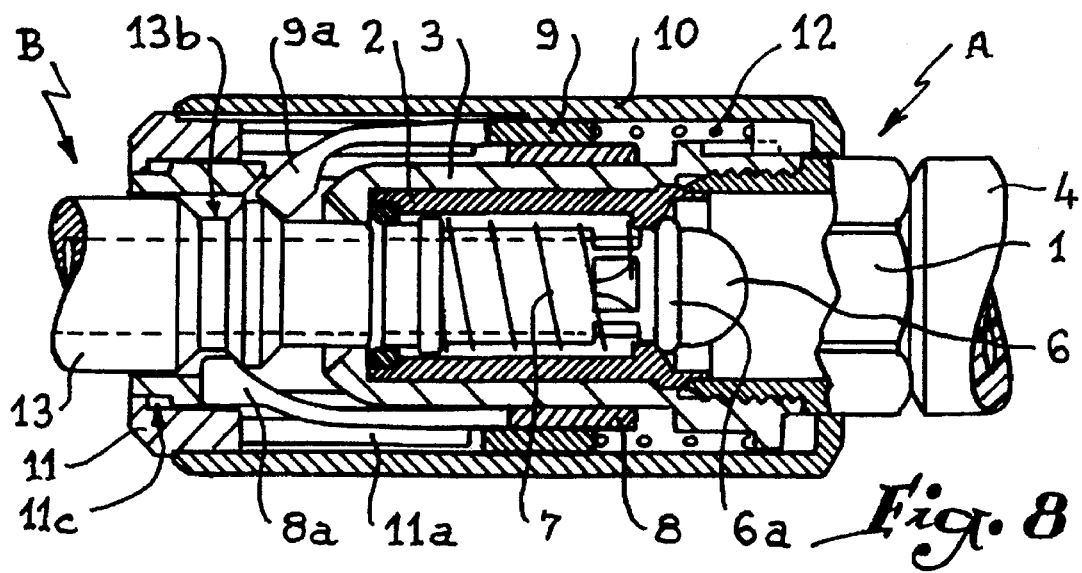

The intermediate position illustrated in FIG. 8 is thus taken, for which valve 6 is closed, while the piece 13 of the male element B is retained axially by the claws 8a and can therefore not be dissociated from the female element A. It will be noted that, in this intermediate position, the pressurized fluid enclosed in the pipe 14 escapes to the outside through the clearances existing between the pieces of the female element A and through longitudinal grooves 10b made to that end in the inner wall of the sleeve 10. There is thus decompression of the pipe 14 and of the piece 13 which forms the male element B.

Figure 9:
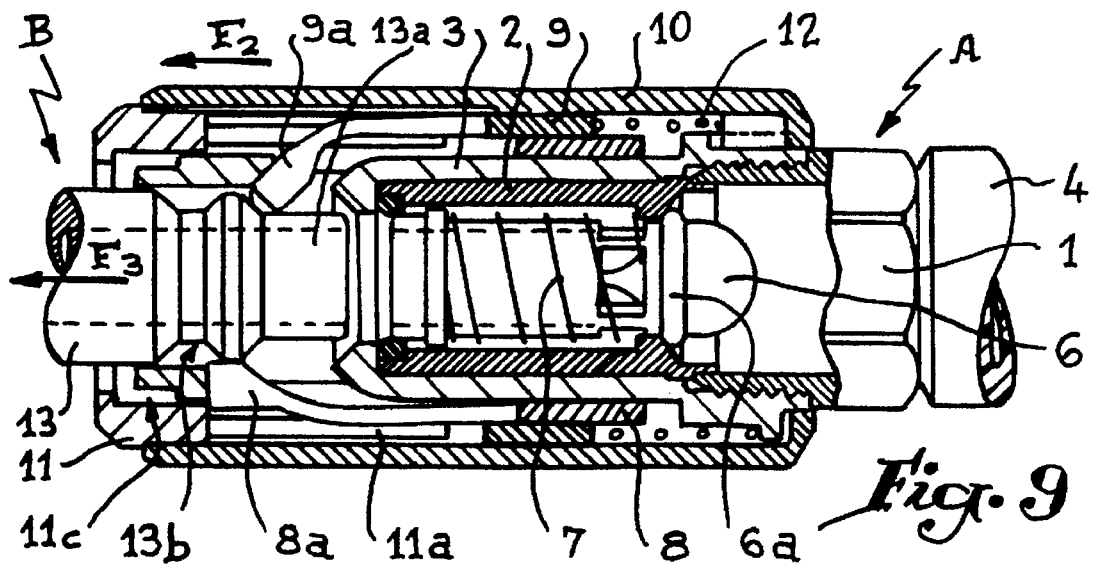

In order to disengage the latter from the female element A, the operator must act again on the bush 10-11 by displacing it axially towards the front, in the direction of arrow F2 in FIG. 9. The axial displacement of the bush 10-11 causes the ends of the claws 8a of the safety ring 8 are no longer engaged in the bore 11c and are consequently free to open radially to leave the depression 13b when the operator exerts pulling forces on the male element B (arrow F3 in FIG. 9). The decompression exerted in the intermediate position according to FIG. 8 avoids any risk of sudden expulsion.

Once the male element B is completely extracted from the female connection A, the spring 12 returns the ring 9 to the standby position. It will be noted that the axial displacement of the ring 9 is limited by stop of the teeth 9b of this ring against the front edge of the flat portions 3a, which eliminates any risk of untimely blocking. The connection is thus ready for a new connection.

It goes without saying that the number of claws 8a and 9a may vary to a wide extent, as a function in particular of the diameter of the connections to be made. Furthermore, it should be noted that, except of course for the springs 7 and 12, virtually all the pieces constituting the quick connection according to the invention are capable of being easily made of molded plastic, which substantially reduces the weight of the device and its manufacturing costs; the different pieces may be assembled with the aid of robots or manipulators, without particular difficulty.

What is claimed is:

1. A quick release safety coupling connector for removably joining first and second fluid conveying conduits comprising,
   a tubular body,
   a female member defining a fluid passageway and having first and second ends,
   a valve member slidably mounted within said female member between an open position in which said fluid passageway communicates with the first conduit and a closed position wherein said fluid passageway is closed with respect to the first conduit,
   a male member extending from the second conduit and having an end portion receivable within said second end of said female member so as to engage said valve member, said male member including an annular depression,
   a locking member engageable with said depression in said male member for securing said male member within said female member so as to retain said valve member in said open position,
   a safety member mounted about said female member and including a plurality of yieldable claws which are receivable within said depression of said male member to thereby retain said male member within said body,
   a bush surrounding said body and said male and female members and being axially moveable in a first direction with respect thereto from a first position wherein said locking member and said claws of said safety member are engageable with said depression to thereby retain said valve member in said open position to a second position wherein said locking member is released from said depression and said male member is separated from said female member while being retained within said body by said claws of said safety member which are retained within said depression, said bush being thereafter moveable in a second direction opposite said first direction whereby said claws of said safety member are released from said depression, whereby said male member is released from said body.

2. The quick release safety coupling connector of claim 1 wherein said body includes a plurality of first and second slots therethrough, said locking member including a plurality of yieldable locking claws which extend through said first slots so as to be engageable with said depression in said male member, and said claws of said safety member extending through said second slots in said body into said depression in said male member.

3. The quick release safety coupling connector of claim 2 wherein said safety member includes an annular ring from which said claws extend, said locking member including an annular ring from which said locking claws extend, and said annular ring of said safety member being concentrically mounted intermediate said body and said annular ring of said locking member.

4. The quick release safety coupling connector of claim 3 including spring means for urging said locking member toward said first slots in said body.

5. The quick release safety coupling connector of claim 4 including a plurality of flat portions formed on said body spaced from said first and second slots, said safety member including a plurality of teeth extending outwardly from said annular ring and engageable within said flats on said body.

6. The quick release safety coupling connector of claim 5 wherein said bush includes a cylindrical sleeve and a front element, said front element including a plurality of longitudinal extensions including outwardly extending tabs which are engageable in openings formed in said sleeve to thereby retain said longitudinal extensions of said front element within said sleeve, said front element being engageable with said claws of said safety member when said male element is in said intermediate position to thereby prevent said claws of said safety member from being released from said depression in said male member.

7. The quick release safety coupling connector of claim 6 wherein said second slots in said body have a greater axial length than said first slots therein.

8. The quick release safety coupling connector of claim 7 including resilient means for normally urging said valve member into seated engagement with said first end of said female member so as to close said fluid passageway with respect to the first conduit.

9. The quick release safety coupling connector of claim 1 wherein said bush includes a cylindrical sleeve and a front element, said front element including a plurality of longitudinal extensions including outwardly extending tabs which are engageable in openings formed in said sleeve to thereby retain said longitudinal extensions of said front element within said sleeve, said front element being engageable with said claws of said safety member when said male element is in said intermediate position to thereby prevent said claws of said safety member from being released from said depression in said male member.

* * * * *